United States Patent [19]

Kummermehr et al.

[11] Patent Number: 5,600,919

[45] Date of Patent: Feb. 11, 1997

[54] MINERAL WOOL PRODUCTS FOR THE CULTIVATION OF PLANTS

[75] Inventors: Hans Kummermehr, Ludwigshafen; Lothar Bihy, Kaiserslautern, both of Germany

[73] Assignee: Isover Saint-Gobain, Courbevoie, France

[21] Appl. No.: 444,357

[22] Filed: May 18, 1995

Related U.S. Application Data

[63] Continuation of Ser. No. 788,450, Nov. 6, 1991, abandoned.

[30] Foreign Application Priority Data

Nov. 6, 1990 [DE] Germany ............... 40 35 249.8

[51] Int. Cl.$^6$ ............... A01G 31/00; A01C 1/06; A01C 21/00

[52] U.S. Cl. ............... 47/59; 47/57.6; 47/77; 47/86

[58] Field of Search ............... 47/59, 60, 61, 47/62, 63, 64, 65, 81, 59 C, 59 CO, 57.6, 77, 86

[56] References Cited

U.S. PATENT DOCUMENTS

| | | | |
|---|---|---|---|
| 3,973,355 | 8/1976 | McKenzie | 47/59 |
| 4,803,803 | 2/1989 | Moffet, Jr. | 47/59 |
| 5,244,722 | 9/1993 | Kummermehr et al. | 428/283 |

FOREIGN PATENT DOCUMENTS

| | | | |
|---|---|---|---|
| 0354748 | 2/1990 | European Pat. Off. | A01G 31/00 |
| 0388287 | 9/1990 | European Pat. Off. | |
| 2068634 | 8/1971 | France . | |
| 2599663 | 12/1987 | France . | |
| 2223248 | 2/1983 | United Kingdom . | |
| 2127005 | 4/1984 | United Kingdom | C05G 3/00 |

OTHER PUBLICATIONS

World Patents Index, Section CH, Week 9018, 26 Mar. 1990, Derwent Publication, Class A Abstract.

*Primary Examiner*—Kevin E. Weddington
*Attorney, Agent, or Firm*—Oblon, Spivak, McClelland, Maier & Neustadt, P.C.

[57] ABSTRACT

A product made of bound mineral wool for the cultivation of plants, in which a reversibly water adsorbing agent insoluble in water is bound to the mineral wool, serves for the extensive grassing of soilless grounds, in particular the grassing of roofs. It contains, as a reversibly water adsorbing agent, in particular pyrogen silicic acid. Preferably, the product is available in the form of a felt or the form of a plate with a density of more than 50 kg/m$^3$, particularly more than 70 kg/m$^3$.

11 Claims, No Drawings

MINERAL WOOL PRODUCTS FOR THE CULTIVATION OF PLANTS

This application is a Continuation of application Ser. No. 07/788,450, filed on Nov. 6, 1991, now abandoned.

BACKGROUND OF THE INVENTION

1. Field of the Invention

This invention relates to mineral wool products to be used for the cultivation of plants, a method for manufacturing such a product as well as the use of this product for cultivating soilless grounds, particularly roofs, requiring extensive irrigation.

2. BACKGROUND OF THE PRIOR ART

Apart from the fibering process, an important stage in the production of mats with mineral fiber base is the production of the mat as such. In a well-known method, the molten glass is drawn into fibers for example by a centrifuging fiber forming process and an aqueous composition of binding agent based on a thermosettable resin is sprayed onto the fibers which are then collected by a collection device consisting for example, of an endless gas and water-permeable conveyor belt. Vacuum boxes are placed under the endless belt in order to create a certain subpressure. Due to this gas/and water-permeability, the mixtures of the fibers, the large amounts of gas generated by the fibering by burners or especially by air-induction and the water sprayed on the fibers can be separated, the fibers remaining on the belt and the gas and water mixture being sucked off below the conveyor belt. The wet fiber mattress is carried by the conveyor to a conforming and binding polymerizing chamber wherein the binder is cured and the mattress is calibrated to form the mat.

The gas/water mixture is spoiled with particles of the binding agent and remnants of fibers and consequently, is then treated with water in a washer. This cleaning treatment runs through filters on which the solid matter is deposited. The water cleaned in this way is then reintroduced into the washer, fresh water being eventually added only for compensating possible evaporation.

In addition to the advantageous mechanical properties, the polymerized binder, generally a phenol formaldehyde or urea formaldehyde resin, confers to the mineral wool product hydrophobic properties, although the mineral wool itself has hydrophilic properties. Such hydrophobization is suitable for products used in the construction industry as heat and/or sound insulating means since high requirements must be fulfilled with respect to the water resistivity of this product.

If, however, the mineral wool product is to be used as a substrate for cultivation of plants in soilless culturing, it is necessary that the mineral wool product be able to adsorb water or aqueous nutritive solutions or take them up in capillary fashion so that the plant roots or even the seeds spread out on the mineral wool are sufficiently supplied with water and/or aqueous nutritive solutions. As the traditionally produced mineral wool products do not fulfill these requirements for hydrophilic qualities, it is therefor necessary to use suitable additives in order to achieve this desired property.

From European Patent 201426 it is known to impregnate mineral fibers bound with a thermosettable resin binder, which are to be processed into blocks of substrates for plant cultivation, with a non-ionic tenside based on ethylated fatty alcohols.

Moreover, from German DE 2057945, it is known to render mineral wool products water absorbing during the production process by applying a mixture of phenol formaldehyde or urea formaldehyde resin and a tenside to the fibers.

Hydrophilizing agents containing the known tensides have the disadvantage of creating flocculations mainly of phenol resins when using the water effluents cleaning system, which then lead to clogging of the filters. Such a hazard may lead to an undesired breakdown of the whole production line since both time and cost-intensive cleaning of the filters becomes necessary.

Apart from this difficulty, these hydrophilizing agents have the further disadvantage that, due to their tensides content, they are washed out of the mineral wool itself in the course of time. This means that the mineral wool products lose their hydrophilic qualities and, on account of the content of resin binder, become hydrophobic again. Moreover, the mineral wool products containing tensides can indeed be wetted more easily but the water is not adsorbed at the mineral wool or retained by it and due to the effect of the tensides, flows off immediately or evaporates at once so that it is available for plant cultivation for only a very short time.

SUMMARY OF THE INVENTION

The goal of the invention therefore is to provide mineral wool products for the cultivation of plants having good mechanical stability, which has a water absorbing or storage characteristics and which furthermore, has hydrophilic qualities which are not lost under weathering conditions.

The goal is achieved by binding to the mineral wool a water-insoluble agent which is reversibly water absorbing by spraying the fibers with this agent to comprise the molded product after spraying them with binder but prior to polymerizing the binder.

A further goal of the present invention also addresses soilless cultivation in areas by providing a product for roofs, walls, streets and other areas exposed to extensive watering by means of rain.

The mineral wool product has the advantage of easily taking up water in liquid or gaseous form, for example as rain, pouring water, fog or as gaseous or droplet vapor contained in the atmosphere. Furthermore, it adsorbs the water taken up so that the latter can neither flow off nor vaporize under usual weathering conditions. Thus, it serves as water storage tank. However, plants are able to develop sucking forces for water of such a strength that they overcome the adsorption forces and, under their effect, the water is desorbed so that it becomes available to the plants in times of dryness.

In the scope of the invention both inorganic and organic substances are suited for use as reversible water adsorbing agents insoluble in water.

As inorganic substances, for example, different clay minerals, aluminum oxide $Al_2O_3$ or ALO(OH) as well as their hydrates and silicone dioxide $Sio_2$ can be used, which are able to reversibly adsorb large quantities of water.

Precipitated silicic acid as well as highly dispersed pyrogen silicic acid obtained by flame hydrolysis have proved to be particularly suitable, the latter being sold for example under the trade names "AEROSIL" or "CAB-O-SIL". Such silicic acids gained by way of flame hydrolysis of $SiCl_4$ have a large surface area almost free of pores which can measure 100 to 500 $m^2/g$.

So-called "superabsorbers", such as acrylamide/acrylic acid copolymerisates sold under the trade name "STOCKOSORB" are especially suited as organic water adsorbing agents insoluble in water.

Pyrogen silicic acid which can be employed, in accordance with the invention, is able to reversibly adsorb a multiple of its weight of water on its very large surface area. It is completely insoluble in contrast to the silicic acid which, according to the method indicated in European Patent Application 354748, is applied on rock wool in addition to a tenside. The rock wool treated in such a way is, according to this reference, a culture substrate from which silicon dioxide, which takes a long time to dissolve, dissolves step-by-step in the nutritive solution with which the plant is supplied and thus takes over an active part in, for example, stimulating the growth of the plant.

In contrast thereto, the water adsorbing agent insoluble in water, which is used according to the invention, is not dissolved and thus remains on the mineral wool. It is not washed out, either, as it is (probably via hydrogen bonds) irreversibly bound to the mineral wool under weathering conditions. Furthermore, the molded product according to the invention does not contain tensides which, according to the prior art, are contained in molded products of bound mineral wool for the cultivation of plants.

In the scope of the present invention, in accordance with the scientific nomenclature in physics and chemistry, the term reversible "water adsorption" in the specification and the claims means a reversible attachment of water in gaseous or liquid form to the sold water adsorbing agent. In the commercial and technical field such an adsorption frequently is referred to as "absorption" as well.

For the production of mineral wool products according to the invention, the inorganic as well as the organic water adsorbing agents are suspended in water, the suspension being preferably dispersed using a high performance disperser, e.g., of the trade name "ULTRATURRAX". During the production of the mineral wool, the suspension is applied to the fibers in the chute, namely in the space between the fibering device and the conveyor belt or on the conveyor belt running therebelow. In the chute, the still hot fibers are sprayed with the resin binder. The reversibly water adsorbing agent insoluble in water is sprayed onto the mineral wool preferably not together with the resin binder, but subsequently, either still in the chute or on the conveyor belt so that the contact with the liquid resin binder does not impair the effectivity of the agent. However, it is possible to spray the water adsorbing agent insoluble in water onto the mineral wool before or at the same time as the resin binder.

The suspension in water of the water adsorbing, water-insoluble agent can contain up to 20% by weight of solid matter, preferably 3 to 7% by weight of solid matter. An aqueous suspension of 4 to 5% by weight of solid matter has proved particularly suitable in practical use.

The water adsorbing agent is added to the mineral wool in a quantity of at least 0.05%, relative to the weight of the mineral wool. Larger quantities, however, increase the adsorptive capacity so that preferably 0.1 to 1% of the water adsorbing agent, relative to the weight of the mineral wool is added.

A special advantage of the reversibly water adsorbing agent insoluble in water which is applied to the mineral wool lies in the fact that the agent neither disintegrates nor volatilizes when the mineral wool mat, as is generally common, is led through a tunnel oven with an ambient temperature of about 200° C. for curing the binding agent. Also, its water adsorptive capacity is not significantly impaired by this heat treatment.

The mineral wool product can, in the scope of the present invention, be available as a felt. This makes it possible to adapt it to unevenness of a base on which it rests.

The use of the mineral wool product in the form of a plate with a raw density of more than 60 kg/m$^3$ particularly more than 70 kg/m$^3$ has the advantage that such plates can be produced on a large scale and relatively inexpensively and, moreover, with such stability that they can be walked on, if need be.

It also is possible to add a fertilizer to the molded part in the form of a long-term fertilizer. During times of dampness, e.g., rain or fog, the fertilizer is dissolved and thus becomes available for the plant. It also is possible to add a pesticide to the molded product, for example a fungicide, together with the water adsorbing agent insoluble in water or separately.

According to an embodiment of the invention, a roof is at least partially covered with the molded products in accordance with the invention, and is provided with seeds or plants. It may be favorable, especially if the seeds are to be used for germination, to apply the seeds onto the mineral wool plates and then cover the latter with a Humus layer so as to product the seeds from being eaten by birds or from wind drifts. As the mineral wool plates are mechanically stable, they can, when sufficiently supported, be used for roof coverings which can be walked on.

Furthermore, such mineral wool plates have good resistance to atmospheric exposure.

DETAILED EMBODIMENTS OF THE INVENTION

Further advantages and features of the present invention can be seen from the description of an example.

EXAMPLE

A mineral wool plate is produced as follows:

A basalt melt, as mineral melt, is drawn into fibers as known, using, for example, the blast drawing method. Subsequent to the fibering procedure, an aqueous suspension of AEROSIL is sprayed. AEROSIL is a pyrogen silicic acid and has a surface area of 200 to 500 m$^2$/g. The aqueous AEROSIL suspension was produced as follows: 4% of the AEROSIL was suspended in water using an ULTRATURRAX.

Subsequent to the treatment of the mineral fibers with the AEROSIL suspension, the mineral wool mat produced is processed as known to obtain mineral wool plates for the cultivation of plants.

As indicated above, the aqueous dispersion of the reversibly water adsorbing agent insoluble in water is produced in the form of a 4 to 5% suspension and sprayed onto the plates.

The mineral wool plates which are produced by way of reversibly water adsorbing agent as described above have, as plates for grassing roofs, a dimension of approximately 60×100×10 cm, their raw density being approximately 70 kg/m$^3$.

The hydrophilic qualities of the mineral wool plates produced can be measured, for example, by making the so-called sinking test. If the molded products of bound mineral wool have hydrophilic qualities they must be sunk after approximately 30 to 240 s, a fact which can be observed with all mineral wool plates if they are produced using a reversibly water adsorbing and water-insoluble agent of the present invention.

A further measurement for the hydrophilic qualities of mineral wool products is the capillary water absorption. In this test, the mineral wool products to be examined are sealed with paraffin at their front sides and put on the surface of a water bath of about 20° C. with their upper and lower side, respectively. The capillary water absorption of the mineral wool plate produced in accordance with the invention amounts to 100 to 200 g/dm$^2$ after 30 seconds, 190 to 225 g/dm$^2$ after 1 hour and 230 to 250 g/dm$^2$ after 24 hours.

So as to ensure the suitability of such mineral wool plates for the grassing of roofs, the mineral wool plates were examined for the aptness as fertilizing and growing substrate.

In doing so, it turned out that in cultivation tests with tomato seeds a germination rate of more than 90% was achieved.

Moreover, in terms of Numbers, only few root deformations were observed, which means that the mineral wool plates obtained are excellently suited as fertilizing and growing substrate for cultivated plants.

For the purpose of grassing roofs, it is necessary to cover the roof construction with a waterproof foil and then apply mineral wool plates produced in accordance with the invention onto the whole surface area, which ensures a perfect roof covering as the mineral wool products of the present invention have at the same time good mechanical stability.

In the case of roof coverings of steep roofs, it therefore is useful to insert waterproof strips, e.g., made of conventional mineral fiber plates, between the abutting surfaces of the roof grassing plates running parallel to the eaves, so that rain water falling on the plates cannot flow off immediately in the direction of the eaves.

The invention has been described above with reference to specific embodiments. These are not intended as limiting, and save for the recitations of the claims below, alternatives will occur to those of skill in the art which remain within the scope of the invention.

What is claimed is:

1. A mineral wool product suitable for the soilless cultivation of plants, comprising: mineral fibers bound by a binder selected from the group consisting of a phenol-formaldehyde resin and a urea-formaldehyde resin into a geometric form, said fibers bearing a water insoluble, reversibly water-adsorbing agent, said reversibly water-adsorbing agent comprising pyrogen silicic acid or precipitated silicic acid.

2. A mineral wool product in accordance with claim 1, wherein said product comprises at least 0.5% of the water adsorbing agent, relative to the weight of the mineral wool.

3. A mineral wool product according to claim 1, wherein it is provided in the form of a felt.

4. A mineral wool product according to claim 1, wherein it is provided in the form of a plate having a density of more than 50 kg/m$^3$.

5. A mineral wool product of claim 4, wherein said density is more than 70 kg/m$^3$.

6. A mineral wool product according to claim 1, wherein it contains at least one of a fertilizer and a herbicide.

7. In a method for the production of a mineral wool product according to claim 1, comprising fiberization of a mineral melt to form mineral wood fibers, and applying a binding agent thereto, and subsequently forming said fibers into a mat and curing said binder, the improvement comprising that subsequent to the fiberization procedure of said mineral melt a water insoluble, reversibly water-adsorbing agent comprising pyrogen silicic acid or precipitated silicic acid is added to the mineral wool fibers separately of the binding agent.

8. A method according to claim 7, wherein the water adsorbing agent is sprayed in the form of an aqueous suspension.

9. A method according to claim 8, wherein the mineral wool provided with the binding agent and the water adsorbing agent is treated thermally.

10. A method of soilless cultivation comprising the products of claim 1 on a base exposed to the weather such that said products exhibit a surface exposed to weathering, distributing growing materials selected from the group consisting of plants, seeds, spores and mixtures thereof on said surface, and allowing said growing materials to grow.

11. A method of soilless cultivation according to claim 9, wherein a protective layer comprised of decomposed organic matter is distributed over said growing material.

* * * * *